US009250368B2

(12) United States Patent
Padiyath et al.

(10) Patent No.: US 9,250,368 B2
(45) Date of Patent: Feb. 2, 2016

(54) DUAL-SIDED DAYLIGHT REDIRECTING FILM

(75) Inventors: Raghunath Padiyath, Woodbury, MN (US); Charles A. Marttila, Shoreview, MN (US); Bing Hao, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/232,695

(22) PCT Filed: Jul. 17, 2012

(86) PCT No.: PCT/US2012/047054
§ 371 (c)(1),
(2), (4) Date: Mar. 27, 2014

(87) PCT Pub. No.: WO2013/012858
PCT Pub. Date: Jan. 24, 2013

(65) Prior Publication Data
US 2014/0198390 A1  Jul. 17, 2014

Related U.S. Application Data

(60) Provisional application No. 61/509,280, filed on Jul. 19, 2011.

(51) Int. Cl.
*G02B 5/04* (2006.01)
*E06B 9/24* (2006.01)
*F21S 11/00* (2006.01)

(52) U.S. Cl.
CPC ... *G02B 5/04* (2013.01); *E06B 9/24* (2013.01); *G02B 5/045* (2013.01); *E06B 2009/2417* (2013.01); *F21S 11/007* (2013.01)

(58) Field of Classification Search
CPC  G02B 5/045; E06B 2009/2417; F21S 11/007
USPC .......................................... 359/592, 594, 595
See application file for complete search history.

(56) References Cited

U.S. PATENT DOCUMENTS

D32,802 S  *  6/1900  Deissler ...................... D25/106
717,782 A  *  1/1903  Wadsworth .................. 359/594
(Continued)

FOREIGN PATENT DOCUMENTS

CA      2598729         2/2009
DE   10 2008 05585      5/2010
(Continued)

OTHER PUBLICATIONS http://www.photonics.com/EDU/Term.aspx?TermID=6393 Definition of prism from Photonics dictionary, Sep. 2009.*
(Continued)

*Primary Examiner* — Christopher Mahoney
(74) *Attorney, Agent, or Firm* — Jeffrey M. Olofson

(57) ABSTRACT

Dual-sided daylight redirecting films include an optical substrate with two solar light redirecting layers disposed on the major surfaces of the optical substrate. The light redirecting layers are microstructured surfaces forming a plurality of prism structures. At least one of the microstructured surfaces is an ordered arrangement of a plurality of asymmetric refractive prisms, and the two solar light redirecting layers are not identical or mirror images. Articles may be prepared that include the dual-sided daylight redirecting film and one or more glazing substrates.

18 Claims, 3 Drawing Sheets

(56) References Cited

U.S. PATENT DOCUMENTS

| | | | | |
|---|---|---|---|---|
| 720,138 | A * | 2/1903 | Hartung | 359/594 |
| 720,386 | A * | 2/1903 | Wadsworth | 359/593 |
| 734,020 | A * | 7/1903 | Wadsworth | 359/594 |
| 737,979 | A * | 9/1903 | Wadsworth | 359/594 |
| 752,429 | A * | 2/1904 | Wadsworth | 359/594 |
| 2,844,998 | A * | 7/1958 | Vincent | 359/593 |
| 3,809,141 | A * | 5/1974 | Loerop | 160/89 |
| 3,841,890 | A | 10/1974 | Coaker | |
| 4,144,217 | A | 3/1979 | Snelgrove | |
| 4,557,565 | A | 12/1985 | Ruck | |
| 4,657,355 | A | 4/1987 | Negishi | |
| 4,693,935 | A | 9/1987 | Mazurek | |
| 4,773,733 | A | 9/1988 | Murphy | |
| 4,989,952 | A | 2/1991 | Edmonds | |
| 5,156,894 | A | 10/1992 | Hood | |
| 5,198,922 | A * | 3/1993 | Chahroudi | 359/290 |
| 5,223,465 | A | 6/1993 | Ueki | |
| 5,295,051 | A | 3/1994 | Cowling | |
| RE34,605 | E | 5/1994 | Schrenk | |
| 5,360,659 | A | 11/1994 | Arends | |
| 5,579,162 | A | 11/1996 | Bjornard | |
| 5,882,774 | A | 3/1999 | Jonza | |
| 5,940,149 | A | 8/1999 | Vanderwerf | |
| 6,049,419 | A | 4/2000 | Wheatley | |
| 6,322,236 | B1 | 11/2001 | Campbell | |
| 6,616,285 | B2 | 9/2003 | Milner | |
| 6,887,917 | B2 | 5/2005 | Yang | |
| 2008/0291541 | A1 | 11/2008 | Padiyath | |
| 2010/0007962 | A1 | 1/2010 | Hughes | |
| 2011/0043919 | A1 | 2/2011 | Ko | |

FOREIGN PATENT DOCUMENTS

| | | |
|---|---|---|
| DE | 102008055857 A1 * | 5/2010 |
| EP | 0753121 | 11/2001 |
| WO | 2011-084303 | 7/2011 |
| WO | 2011-084391 | 7/2011 |
| WO | 2012-134787 | 10/2012 |
| WO | 2013-012865 | 1/2013 |

OTHER PUBLICATIONS

Machine translation of DE 102008055857 A1 May 2010.*
International Search Report for PCT International Application No. US2012/047054 Mailed on Jan. 21, 2013, 3 pages.

* cited by examiner

DUAL-SIDED DAYLIGHT REDIRECTING FILM

CROSS REFERENCE TO RELATED APPLICATIONS

This application is a national stage filing under 35 U.S.C. 371 of PCT/US2012/047054, filed Jul. 17, 2012, which claims priority to U.S. Provisional Application No. 61/509,280, filed Jul. 19, 2011, the disclosure of which is incorporated by reference in its/their entirety herein.

FIELD OF THE DISCLOSURE

This disclosure relates generally to light management constructions, specifically to light redirecting constructions, especially solar light redirecting films and glazing units.

BACKGROUND

A variety of approaches are used to reduce energy consumption in buildings. Among the approaches being considered and applied is the more efficient use of sunlight to provide lighting inside buildings. One technique for supplying light inside of buildings, such as in offices, etc. is the redirection of incoming sunlight. Because sunlight enters windows at a downward angle, much of this light is not useful in illuminating a room. However, if the incoming downward light rays can be redirected upward such that they strike the ceiling, the light can be more usefully employed in lighting the room.

A variety of articles have been developed to redirect sunlight to provide illumination within rooms. A light deflecting panel is described in U.S. Pat. No. 4,989,952 (Edmonds). These panels are prepared by making a series of parallel cuts in sheets of transparent solid material with a laser cutting tool. Examples of daylighting films include European Patent No. EP 0753121 and U.S. Pat. No. 6,616,285 (both to Milner) which describe optical components that include an optically transparent body with a plurality of cavities. Another daylighting film is described in U.S. Pat. No. 4,557,565 (Ruck et al.), which describes a light deflecting panel or plate which is formed of a plurality of parallel identically spaced apart triangular ribs on one face. Examples of films that have a plurality of prism structures are described in US Patent Publication No. 2008/0291541 (Padiyath et al.), and pending US patent application Ser. No. 61/287,360, titled "Light Redirecting Constructions" filed Dec. 17, 2009 (Padiyath et al.), and Ser. No. 61/287,354, titled "Light Redirecting Film Laminate" filed Dec. 17, 2009 (Padiyath et al.). Constructions that incorporate both light redirection and light diffusion include the pending U.S. Patent Application Ser. No. 61/469,147, titled "Hybrid Light Redirecting And Light Diffusing Constructions" filed Mar. 30, 2011 (Padiyath et al.), and Canadian Patent Publication No. 2,598,729 (McIntyre et al.).

SUMMARY

Disclosed herein are dual-sided daylight redirecting films and articles prepared with dual-sided daylight redirecting films. In some embodiments, the dual-sided daylight redirecting film comprises a light management construction comprising, an optical substrate having a first major surface and a second major surface opposite the first major surface, a first solar light redirecting layer disposed on the first major surface of the optical substrate, and a second solar light redirecting layer disposed on the second major surface of the optical substrate. The first solar light redirecting layer comprises a first microstructured surface comprising a plurality of multi-sided refractive prisms. The second solar light redirecting layer comprises a second microstructured surface comprising a plurality of multi-sided refractive prisms. At least one of the first or the second microstructured surface comprises an ordered arrangement of a plurality of asymmetric refractive prisms, such that the first solar light redirecting layer and the second solar light redirecting layer are not identical or mirror images.

In some embodiments, the first solar light redirecting layer comprises a first ordered arrangement of a plurality of asymmetric refractive prisms, and the second solar light redirecting layer comprises a second ordered arrangement of a plurality of asymmetric refractive prisms such that the first solar light redirecting layer and the second solar light redirecting layer are not identical or mirror images.

In some embodiments, the asymmetric refractive prisms of the first solar light redirecting layer and the asymmetric refractive prisms of the second solar light redirecting layer comprise the same shape and the periods are misregistered.

Also disclosed are articles comprising a first glazing substrate and a light management construction attached to the first glazing substrate. The light management construction comprises an optical substrate having a first major surface and a second major surface opposite the first major surface, a first solar light redirecting layer disposed on the first major surface of the optical, and a second solar light redirecting layer disposed on the second major surface of the optical substrate. The first solar light redirecting layer comprises a first microstructured surface comprising a plurality of multi-sided refractive prisms. The second solar light redirecting layer comprises a second microstructured surface comprising a plurality of multi-sided refractive prisms. At least one of the first or the second microstructured surface comprises an ordered arrangement of a plurality of asymmetric refractive prisms, such that the first solar light redirecting layer and the second solar light redirecting layer are not identical or mirror images.

In some embodiments, the articles further comprise a second glazing substrate. The second glazing substrate may be disposed on the first glazing substrate, or the second glazing substrate may be disposed on the light management construction. In some embodiments, the second glazing substrate is parallel to the first glazing substrate and separated from the first glazing substrate by a void space. In some embodiments, the light management construction is located within this void space.

BRIEF DESCRIPTION OF THE DRAWINGS

The present application may be more completely understood in consideration of the following detailed description of various embodiments of the disclosure in connection with the accompanying drawings.

Figure 1:
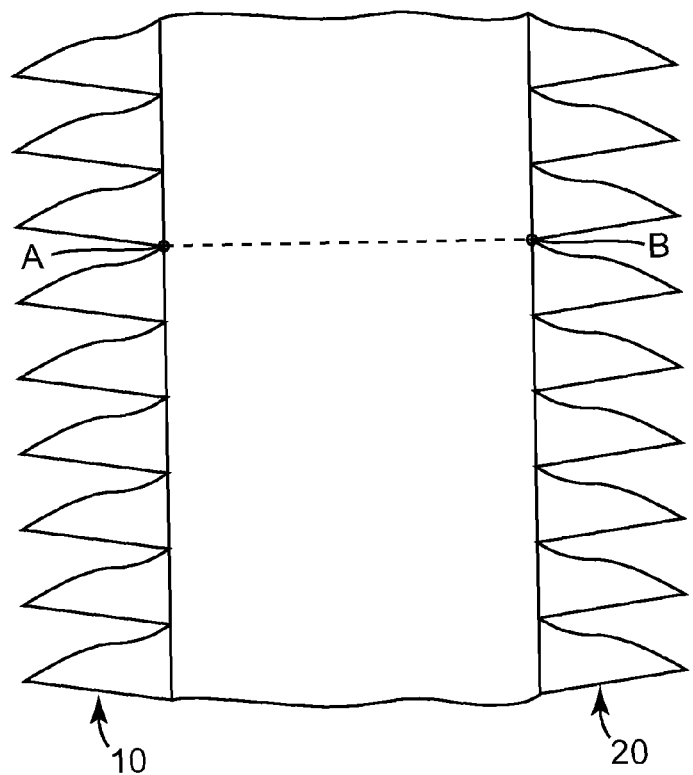
FIG. 1 shows a cross sectional view of a registered dual-sided microstructured film.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Windows and similar constructions are used to provide natural sunlight to rooms, corridors, and the like, in buildings. However, the angle that natural sunlight falls upon windows is such that typically the light may not penetrate far into the room or corridor. Additionally, since the incoming light may be unpleasantly strong near the window, users sitting near the window may be induced to close shutters, blinds or curtains and thus eliminate this potential source of room illumination. Therefore constructions that can redirect sunlight from the normal incident angle to a direction towards the ceiling of a room or corridor would be desirable.

Since there are many windows for which it would be desirable to effect the redirection of sunlight, it is impractical and impossible to replace all the present windows with ones that redirect light. Therefore, the need remains for light management constructions, such as films, that can be attached to existing substrates, such as windows, and redirect light, especially sunlight, in useful directions, such as towards the ceiling of a room to provide illumination for the room.

As discussed in the background section above, a number of films have been developed to redirect sunlight to provide room illumination. In this disclosure, light management constructions are presented that comprise dual-sided daylight redirecting films that are able to redirect light, especially sunlight, in a desirable direction, and additionally are able to redirect more light in a desirable direction than a single sided film construction. The dual-sided daylight redirecting films comprise an optical substrate having a first major surface and a second major surface and solar light redirecting layers disposed on each of the major surfaces. Each of the solar light redirecting layers comprises a microstructured surface comprising a plurality of multi-sided refractive prisms. At least one of the solar redirecting layers comprises an ordered arrangement of a plurality of asymmetric refractive prisms.

The films redirect sunlight from the normal incident direction, which is downward and not very useful for room illumination, to an upwards direction towards the ceiling of the room to provide greater illumination for the room. The films can be applied to substrates, like windows, for example, to provide the light redirection without needing to modify or replace the window itself. It has been discovered, however, that care must be exercized with the two solar redirecting layers. If the two solar light redirecting layers are not identical or mirror images of each other, the amount of light redirected in the desired direction is increased. However, if the two solar light redirecting layers are identical or mirror images of each other, the amount of light redirected in the desired direction may actually be reduced compared to the amount of light redirected by a single solar light redirecting layer.

There are a number of ways of achieving a dual-sided daylight redirecting film comprising two light redirecting layers where each of the solar light redirecting layers comprises a microstructured surface comprising a plurality of multi-sided refractive prisms, and at least one of the sides (we will call it the "first side" for clarity, but this designation is not intended to describe any directionality) is an ordered arrangement of a plurality of asymmetric refractive prisms. In some embodiments, the second side is a non-ordered arrangement of multi-sided refractive prisms. In other embodiments, the second side is an ordered arrangement of a plurality of refractive prisms, either symmetric or asymmetric refractive prisms, but the prisms have a different shape than the shape of the asymmetric refractive prisms on the first side of the dual-sided daylight redirecting film. In still other embodiments, both sides of the dual-sided daylight redirecting film may comprise an ordered arrangement of a plurality of asymmetric refractive prisms with the same shape, but the periods of the ordered arrangements may be different or the periods of the ordered arrangements may be misregistered. Each of these embodiments is described in greater detail below.

The term "optical film" and "optical substrate" as used herein refers to films and substrates that are at least optically transparent, may be optically clear and may also produce additional optical effects. Examples of additional optical effects include, for example, light diffusion, light polarization or reflection of certain wavelengths of light.

The term "optically transparent" as used herein refers to films or constructions that appear to be transparent to the naked human eye. The term "optically clear" as used herein refers to film or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

The term "ordered arrangement" as used herein to describe a plurality of structures, refers to a regular, repeated pattern of structures, or patterns of structures.

Figure 2:
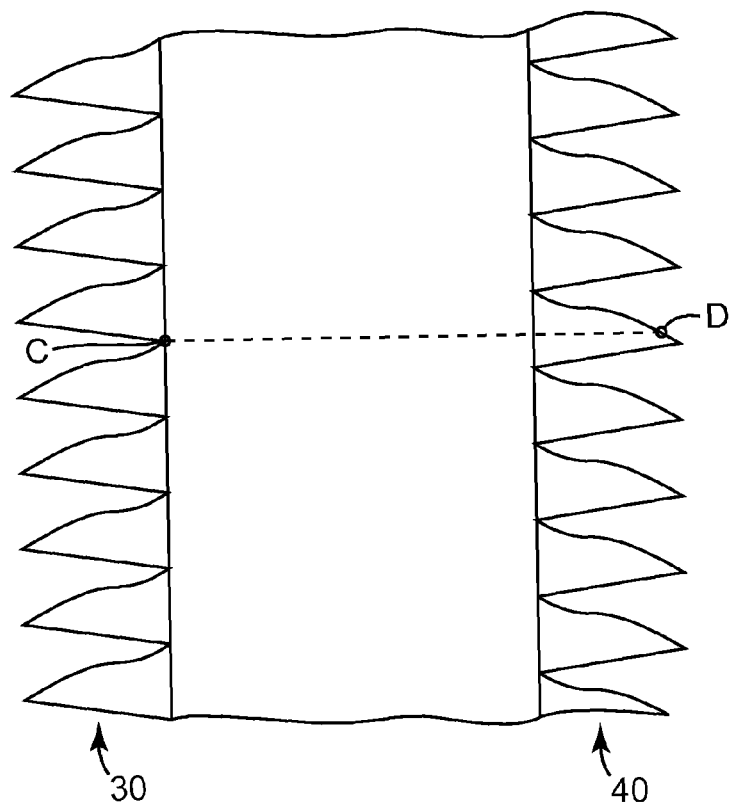
FIG. 2 shows a cross sectional view of a misregistered dual-sided microstructured film.

The terms "registered" and "misregistered" are used herein to describe ordered arrangements of structures. Two parallel ordered arrangements of structures are said to be registered when there is correspondence between the parallel arrangements such that the valleys between structures at the point where the structure begins for one arrangement corresponds to the valley between structures where the structure begins on the second arrangement. This is illustrated by FIG. 1, where Point A of ordered arrangement of structures 10 corresponds to Point B of ordered arrangement of microstructures 20. The structures need not have the same or even similar shapes, as long as there is correspondence between the structures. Two parallel ordered arrangements of structures are said to be misregistered when there is no correspondence between the parallel arrangements such that the valleys between structures at the point where the structure begins for one arrangement does not correspond to the valley between structures where the structure begins on the second arrangement. This is illustrated by FIG. 2, where Point C of ordered arrangement of structures 30 does not correspond to Point D of ordered arrangement of microstructures 40. The structures need not have the same or even similar shapes, as long as there is a lack of correspondence between the structures.

The terms "point", "side", and "intersection" as used herein, have their typical geometric meanings.

The term "aspect ratio" as used herein when referring to a structure attached to a film, refers to the ratio of the greatest height of the structure above the film to the base of the structure that is attached to, or part of, the film.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

The dual-sided light redirecting films of this disclosure comprise an optical substrate having a first major surface and a second major surface opposite the first major surface. A first solar light redirecting layer is disposed on the first major surface of the optical substrate. The first solar light redirecting layer comprises a first microstructured surface comprising a plurality of multi-sided refractive prisms. A second solar light redirecting layer is disposed on the second major surface of the optical substrate. The second solar light redirecting layer comprises a second microstructured surface comprising a plurality of multi-sided refractive prisms. At least one of the first or the second microstructured surface comprises an ordered arrangement of a plurality of asymmetric refractive prisms, such that the first solar light redirecting layer and the second solar light redirecting layer are not identical or mirror images.

A wide variety of optical substrates are suitable for use in the dual-sided light redirecting films of this disclosure. While rigid optical substrates such as glass and polymeric plates (such as polycarbonate plates and polymethylmethacrylate plates) are considered within the scope of this disclosure, typically the optical substrate comprises an optical film. The optical film may be single layer film or it may be a multi-layer film construction. Typically, the optical film or multi-layer optical film, is prepared from polymeric materials that permit the film to be optically clear. Examples of suitable polymeric materials include, for example, polyolefins such as polyethylene and polypropylene, polyvinyl chloride, polyesters such as polyethylene terephthalate, polyamides, polyurethanes, cellulose acetate, ethyl cellulose, polyacrylates, polycarbonates, silicones, and combinations or blends thereof. The optical film may contain other components besides the polymeric material, such as fillers, stabilizers, antioxidants, plasticizers and the like. In some embodiments, the optical film may comprise a stabilizer such as a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The use of a multi-layer optical film substrate permits the optical substrate to supply additional functional roles to the dual-sided light redirecting film besides providing support for the two light redirecting layers. For example, the multi-layer film substrate can provide physical effects, optical effects, or a combination thereof. The multi-layer film substrate may include layers such as a tear resistant layer, a shatter resistant layer, an infrared light reflection layer, an infrared absorbing layer, a light diffusing layer, an ultraviolet light blocking layer, a polarizing layer or a combination thereof. Among the especially suitable multi-layer films are multi-layer film constructions that can reflect infrared light. In this way, the light redirecting laminate can also help to keep the undesirable infrared light (heat) out of the building while allowing the desirable visible light into the building. Examples of suitable multi-layer films useful as the optical film include those disclosed, for example, in U.S. Pat. Nos. 6,049,419, 5,223,465, 5,882,774, 6,049,419, RE 34,605, 5,579,162 and 5,360,659. In some embodiments, the optical film is a multilayer film in which the alternating polymeric layers cooperate to reflect infrared light. In some embodiments, at least one of the polymeric layers is a birefringent polymer layer.

The first major surface and the second major surface of the optical substrate each comprises a solar light redirecting layer. Each of these solar light redirecting layers comprises a microstructured surface comprising a plurality of multi-sided refractive prisms. The microstructured surfaces may contain a wide range of prism structures. In many embodiments, the prism structures are linear prism structures, or pyramidal prism structures. In some embodiments, the prism structures are pyramidal prism structures. The pyramidal prism structures can have any useful configuration such as, for example, shape tip, rounded tip, and/or truncated tip, as desired. The prism structures can have a varying height, spatially varying pitch, or spatially varying facet angle, as desired. In some embodiments, the prism structures have a pitch and height in a range from 50 to 2000 micrometers, or from 50 to 1000 micrometers. Examples of suitable prism structures include those described in US Patent Publication No. 2008/0291541 (Padiyath et al.). As is known in the microstructure art, the microstructures may be identical or some or all of the microstructures may have variations in structure smaller than the scale of the structures themselves.

At least one of the microstructured surfaces comprises an ordered arrangement of a plurality of asymmetric refractive prisms, and the first solar light redirecting layer and the second solar light redirecting layer are not identical or mirror images.

For purposes of discussion, the at least one microstructured surface that comprises an ordered arrangement of a plurality of asymmetric refractive prisms will be called the "first surface" of the dual-sided light redirecting film. This designation is merely to assist in the discussion and is not intended to denote any directionality (such as, for example, facing the incoming solar light). It is desirable that the prisms be asymmetrical such that incoming incident solar light (which comes from above and is incident upon the film at an angle of from 5-80° from the direction perpendicular to the film) is redirected upwards towards the ceiling of the room, but incoming light from below is not redirected downwards. An artifact of symmetrical structures is that the downward directed light could be visible to the observer, which is undesirable.

The plurality of asymmetrical multi-sided refractive prisms on the first surface of the optical substrate is designed to effectively redirect incoming solar light towards the ceiling of a room which contains a window or other aperture containing the light directing film. Typically, the asymmetrical multi-sided refractive prisms comprise 3 or greater sides, more typically 4 or greater sides. The prisms may be viewed as an orderly array of protrusions arising from the surface of the optical substrate. This optical substrate may be the optical film described above or it may be a separate optical film. In many embodiments, the light redirecting layers comprise an optical film with an array of protrusions arising from the first major surface of the optical film, and the layers are adhered to the optical substrate. Typically, the aspect ratio of these protrusions is 1 or greater, that is to say that the height of the protrusion is at least as great as the width of the protrusion at the base. In some embodiments, the height of the protrusions is at least 50 micrometers. In some embodiments, the height of the protrusions is no more than 250 micrometers. This means that the asymmetrical structures typically protrude from 50 micrometers to 250 micrometers from the first major surface of the optical film or optical substrate.

Examples of suitable assymetrical multi-sided refractive prisms are described in pending US patent application Ser. No. 61/287,360, titled "Light Redirecting Constructions" filed Dec. 17, 2009 (Padiyath et al.), and Ser. No. 61/287,354, titled "Light Redirecting Film Laminate" filed Dec. 17, 2009 (Padiyath et al.). An example of a 4 sided prism is one that contains sides A, B, C and D. In this prism, side A is adjacent to the optical substrate, side B is joined to side A, side C is joined to side A, and side D is joined to side B and side C. Side B is angled in such a way that it produces total internal reflection to solar light rays incident upon the second major surface of the optical film and passing through side A. Solar light rays are incident from above the second major surface of the optical film and typically form an angle of from about 5-80° from perpendicular to the first major surface of the optical film depending upon the time of day, time of year, geographical location of the film, etc. The incident light rays that enter the prism and are reflected from side B by the phenomenon of total internal reflection. To achieve total internal reflection, it is desirable that side B not be perpendicular to side A, but be offset from perpendicular by an angle (the angle is arbitrary called $\theta$). The selection of the value for angle $\theta$ will depend upon a variety of variable features including, for example, the refractive index of the composition materials used to prepared the light management film, the proposed geographic location of use for the light management film, etc, but typically the value for angle $\theta$ is in the range 6-14° or even 6-12°.

Side C is joined to side A and connects side A to side D. It is desirable that side C not be perpendicular to side A, but be offset from perpendicular by an angle arbitrarily called $\alpha$. The offset of angle $\alpha$, among other features, aids in preventing light which exits the prism through side D from entering an adjacent prism. As with angle $\theta$, the selection of the value for angle $\alpha$ depends upon a variety of variable features, including the closeness of adjacent prisms, the nature and size of side D, etc. Typically, angle $\alpha$ is in the range 5-25° or even 9-25°.

Side D is the side of the prism from which the redirected light rays exit the prism. Side D may comprise a single side or a series of sides. In some embodiments it is desirable that side D be a curved side, but side D need not be curved in all embodiments. Light rays that are reflected from side B are redirected by side D to a direction useful for improving the indirect lighting of a room. By this it is meant that the light rays reflected from side D are redirected either perpendicular to side A or at an angle away from perpendicular and towards the ceiling of the room.

In some embodiments, side C may be curved, side D may be curved, or the combination of sides C and D may form a single continuously curved side. In other embodiments, side C or D or C and D taken together comprises a series of sides, wherein the series of sides comprises a structured surface. The structured surface may be regular or irregular, i.e., the structures may form regular patterns or random patterns and may be uniform or the structures may be different. These structures, since they are substructures on a microstructure, are typically very small. Typically, each dimension of these structures (height, width and length) is smaller than the dimension of side A.

The intersection of side B and side D forms the apex of the prism. This intersection may be a point, or it may be a surface. If the film is to be bonded to a substrate at the intersection of sides B and D, it may desirable that this intersection be a flat surface instead of sharp point to permit easier bonding of the substrate to the prism structure. If, however, the film is not to be bonded to a substrate at the intersection of sides B and D, it may be desirable that this intersection be a point.

The entire first surface of the optical substrate may contain microstructures, or the microstructures may be present on only a portion of the first surface of the optical substrate. Since the film construction may be attached to a large glazing article, such as, for example, a window, it may not be necessary or desirable for the entire surface of the glazing article to contain a microstructured surface in order to produce the desirable light redirection effect. It may be desirable for only a portion of the glazing article to contain the light redirection film construction, or alternatively, if the entire glazing article surface is covered by a film construction, it may be desirable that only a portion of the film construction contain the light redirecting microstructures. Similarly, the second surface of the optical substrate also contains a microstructured surface, and this second microstructured surface may be present on only a portion of the second surface of the optical substrate. However, at least a portion of the optical substrate has microstructures on both the first and second surfaces.

The ordered arrangement of a plurality of asymmetrical multi-sided refractive prisms can form an array of microstructures. The array can have a variety of elements. For example, the array can be linear (i.e. a series of parallel lines), sinusoidal (i.e. a series of wavy lines), random, or combinations thereof. While a wide variety of arrays are possible, it is desirable that the array elements are discrete, i.e., that the array elements do not intersect or overlap.

The microstructure layer on the first major surface of the optical substrate may be formed in a variety of ways. Typically, the microstructure layer comprises a thermoplastic or a thermoset material. In some embodiments, the microstructure layer is formed on the first surface of the optical substrate. More typically, the microstructure layer is part of microstructured film that is adhered to the first surface of the optical substrate.

The microstructured films described above are manufactured using various methods, including embossing, extrusion, casting and curing, compression molding and injection molding. One method of embossing is described in U.S. Pat. No. 6,322,236, which includes diamond turning techniques to form a patterned roll which is then used for embossing a microstructured surface onto a film. A similar method may be used to form the films described above having an ordered arrangement of a plurality of asymmetrical structures.

Other approaches may be followed for producing a film having a microstructured surface with a repeating pattern. For example, the film may be injection molded using a mold having a particular pattern thereon. The resulting injection molded film has a surface that is the complement of the pattern in the mold. In another and similar approach, the film may be compression molded.

In some embodiments, the structured films are prepared using an approach called casting and curing. In casting and curing, a curable mixture is coated onto a surface to which a microstructuring tool is applied or the mixture is coated into a microstructuring tool and the coated microstructuring tool is contacted to a surface. The curable mixture is then cured and the tooling is removed to provide a microstructured surface. Examples of suitable microstructuring tools include microstructured molds and microstructured liners. Examples of suitable curable mixtures include thermoset materials such as the curable materials used to prepare polyurethanes, polyepoxides, polyacrylates, silicones, and the like.

When a microstructured film is used as the microstructure layer, the microstructured film is typically adhered to the first surface of the optical substrate by an adhesive layer. Examples of suitable adhesives include, for example, heat activated adhesives, pressure sensitive adhesives or curable adhesives. Examples of suitable optically clear curable adhesives include those described in U.S. Pat. No. 6,887,917 (Yang et al.). Depending upon the nature of the adhesive, the adhesive coating may have a release liner attached to it to protect the adhesive coating from premature adhesion to surfaces and from dirt and other debris which can adhere to the adhesive surface. The release liner typically remains in place until the light redirecting laminate is to be attached to the substrate. Typically, a pressure sensitive adhesive is used.

A wide variety of pressure sensitive adhesive compositions are suitable. Typically, the pressure sensitive adhesive is optically clear. The pressure sensitive adhesive component can be any material that has pressure sensitive adhesive properties. Additionally, the pressure sensitive adhesive component can be a single pressure sensitive adhesive or the pressure sensitive adhesive can be a combination of two or more pressure sensitive adhesives.

Suitable pressure sensitive adhesives include, for example, those based on natural rubbers, synthetic rubbers, styrene block copolymers, polyvinyl ethers, poly(meth)acrylates (including both acrylates and methacrylates), polyolefins, silicones, or polyvinyl butyral.

The optically clear pressure sensitive adhesives may be (meth)acrylate-based pressure sensitive adhesives. Useful alkyl(meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methyl-butyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamyl acrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In certain embodiments, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition.

In some embodiments, the adhesive layer is at least partially formed of polyvinyl butyral. The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyl adipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

The adhesive layer may be crosslinked. The adhesives can be crosslinked by heat, moisture or radiation, forming covalently crosslinked networks which modify the adhesive's flowing capabilities. Crosslinking agents can be added to all types of adhesive formulations but, depending on the coating and processing conditions, curing can be activated by thermal or radiation energy, or by moisture. In cases in which crosslinker addition is undesirable one can crosslink the adhesive if desired by exposure to an electron beam.

The degree of crosslinking can be controlled to meet specific performance requirements. The adhesive can optionally further comprise one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, and mixtures thereof can be used.

In addition to being optically clear, the pressure sensitive adhesive may have additional features that make it suitable for lamination to large substrates such as windows. Among these additional features is temporary removability. Temporarily removable adhesives are those with relatively low initial adhesion, permitting temporary removability from, and repositionability on, a substrate, with a building of adhesion over time to form a sufficiently strong bond. Examples of temporarily removable adhesives are described, for example in U.S. Pat. No. 4,693,935 (Mazurek). Alternatively, or in addition, to being temporarily removable, the pressure sensitive adhesive layer may contain a microstructured surface. This microstructured surface permits air egress as the adhesive is laminated to a substrate. For optical applications, typically, the adhesive will wet out the surface of the substrate and flow to a sufficient extent that the microstructures disappear over time and therefore do not affect the optical properties of the adhesive layer. A microstructured adhesive surface may be obtained by contacting the adhesive surface to a microstructuring tool, such as a release liner with a microstructured surface.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the pressure sensitive adhesive. In some embodiments, the pressure sensitive adhesive may contain a UV absorber (UVA) or hindered amine light stabilizer (HALS). Suitable UVAs include, for example, benzotriazole UVAs such as the compounds available from Ciba, Tarrytown, N.Y. as TINUVIN P, 213, 234, 326, 327, 328, 405 and 571. Suitable HALS include compounds available from Ciba, Tarrytown, N.Y. as TINUVIN 123, 144, and 292.

The pressure sensitive adhesive of the present disclosure exhibits desirable optical properties, such as, for example, controlled luminous transmission and haze. In some embodiments, substrates coated with the pressure sensitive adhesive may have substantially the same luminous transmission as the substrate alone.

The dual-sided light redirecting constructions of this disclosure also have a second solar light redirecting layer disposed on the second major surface of the optical substrate, wherein the second solar light redirecting layer comprises a second microstructured surface comprising a plurality of multi-sided refractive prisms. This second solar light redirecting layer is not identical to or the mirror image of the first solar light redirecting layer.

In some embodiments, the second light redirecting layer, while a plurality of multi-sided refractive prisms, it is not a an ordered arrangement of a plurality of refractive prisms. In other words, the plurality of refractive prisms may be arranged such that they are randomly arranged or arranged such that there is no repeating pattern.

In other embodiments, the second light redirecting layer forms an ordered arrangement of a plurality of refractive prisms. The prisms may be symmetrical or asymmetrical. If symmetrical, the prisms may be in any arrangement desired. If the prisms are asymmetrical, the prisms must be either a different shape from the prisms of the first light redirecting layer, or if the prisms are the same shape, the period of the ordered arrangement of a plurality of asymmetrical refractive prisms must be different from the period of the prisms of the first light redirecting layer, or if the prisms are the same shape and the periods are the same or whole number integers of each other, the periods of the first light redirecting layer and the second light redirecting layer must be misregistered. Each of the embodiments where the second light redirecting layer comprises asymmetrical refracting prisms is described in greater detail below.

Figure 3:
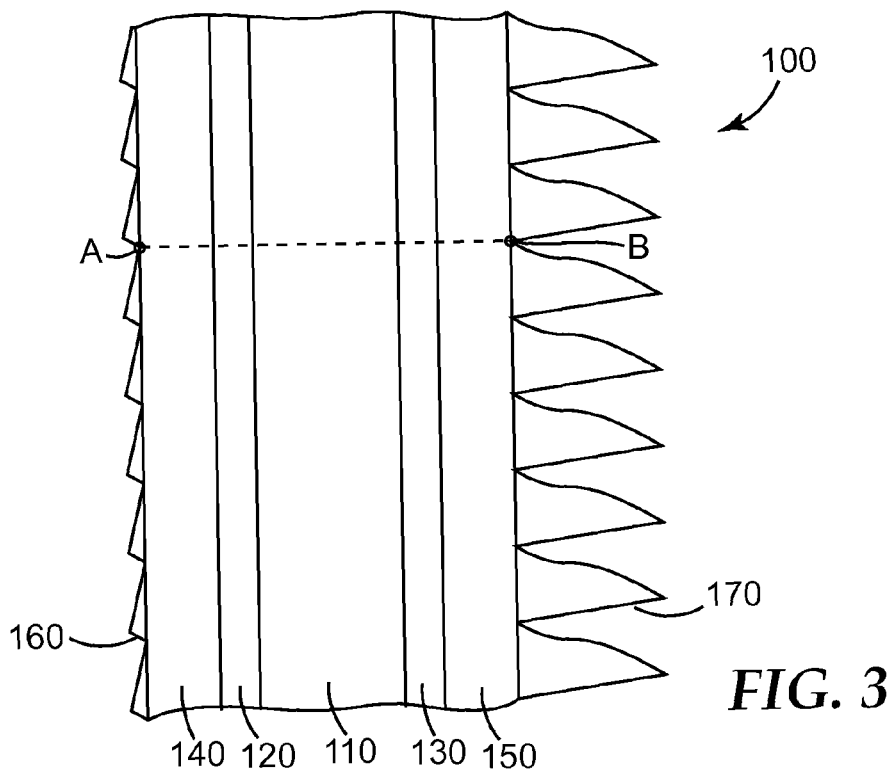
FIG. 3 shows a cross sectional view of a dual-sided light redirecting film of this disclosure.

In some embodiments, the prisms of the second solar light redirecting layer are asymmetrical, and the prisms are different shape from the prisms of the first light redirecting layer. FIG. 3 is a cross sectional view of such a dual-sided light redirecting film of this disclosure. In FIG. 3, dual-sided light redirecting film 100, comprises optical substrate 110. To the first side (again first side is arbitrarily assigned) of optical substrate 110 is attached solar light redirecting layer 150. Solar light redirecting layer 150 comprises a film with projecting asymmetrical prism structures 170. Solar light redirecting layer 150 is adhered to the first major surface of optical substrate 110 by adhesive layer 130. Similarly, second solar light redirecting layer 140 with projecting asymmetrical prism structures 160 is adhered to the second major surface of optical substrate 110 by adhesive layer 120. In FIG. 3, the period of the prism structures 160 on solar light redirecting layer 140 and the period of the prism structures 170 on solar light redirecting layer 150 are registered. Registration is shown by the correspondence of points A and B, similar to the points A and B of FIG. 1. It should be noted that even though the periods of the prism structures 170 on solar light redirecting layer 150 are registered, the first and second solar light redirecting layers 140 and 150 are not identical or mirror images of each other.

In other embodiments (not shown), the periods of the ordered arrangements of prism structures are whole number integers of one another. In these embodiments, there is not a one to one correspondence of prism structures, but the periods correspond in a regular whole number pattern.

Figure 4:
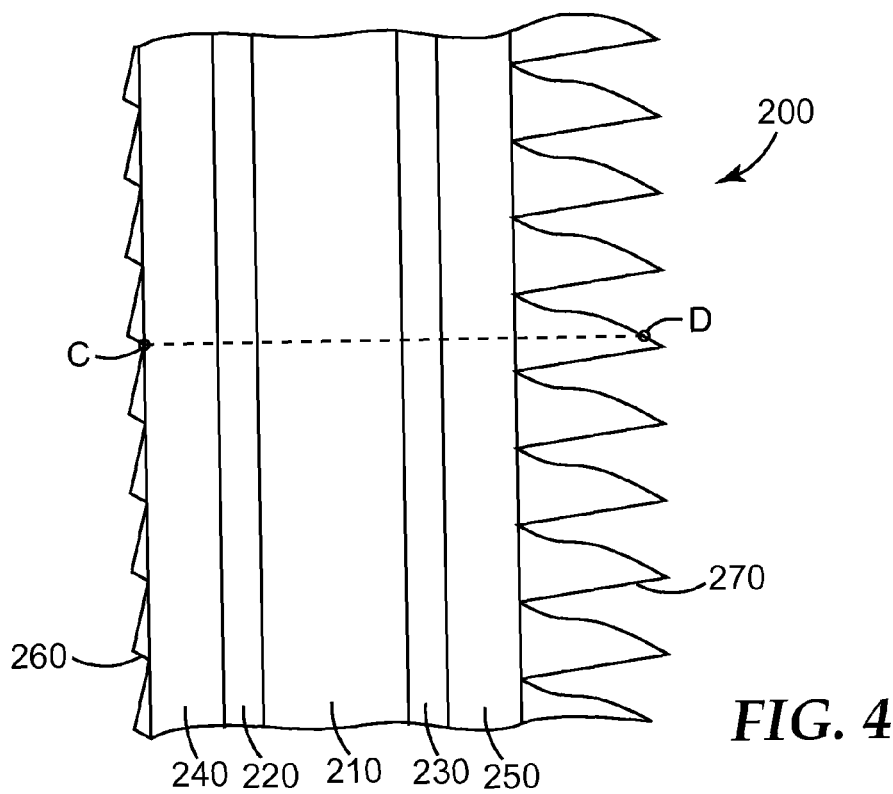
FIG. 4 shows a cross sectional view of a dual-sided light redirecting film of this disclosure.

In FIG. 4, a cross sectional view of another exemplary dual-sided light redirecting film of this disclosure, in which the prisms are asymmetrical and the prisms are a different shape from the prisms of the first light redirecting layer. In FIG. 4, dual-sided light redirecting film 200, comprises optical substrate 210. To the first side (again first side is arbitrarily assigned) of optical substrate 210 is attached solar light redirecting layer 250. Solar light redirecting layer 250 comprises a film with projecting asymmetrical prism structures 270. Solar light redirecting layer 250 is adhered to the first major surface of optical substrate 210 by adhesive layer 230. Similarly, second solar light redirecting layer 240 with projecting asymmetrical prism structures 260 is adhered to the second major surface of optical substrate 210 by adhesive layer 220. In FIG. 4, the period of the prism structures 260 on solar light redirecting layer 240 and the period of the prism structures 270 on solar light redirecting layer 250 are misregistered. Misregistration is shown by the lack of correspondence of points C and D, similar to the points C and D of FIG. 2.

In some embodiments, the prism structures of the first and second light redirecting layers are the same, and the period of the ordered arrangement of a plurality of asymmetrical refractive prisms of the second light redirecting layer is different from the period of the prisms of the first light redirecting layer. The period of the second light redirecting layer may be shorter or longer than the period of the first light redirecting layer. Typically, it is desirable that there be no point of correspondence between the two arrangements of prisms, but if coincident correspondence occurs it is desirable that there be no more than one point of correspondence per 100 prism units.

Figure 6:
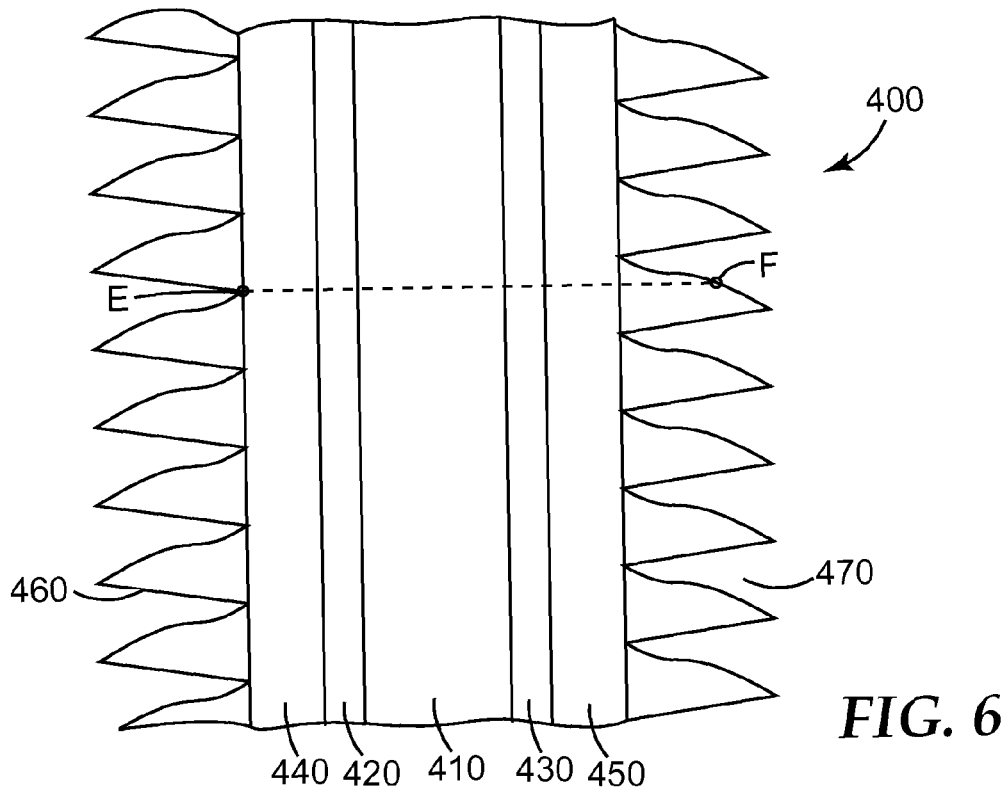
FIG. 6 shows a cross sectional view of a dual-sided light redirecting film of this disclosure.

In some embodiments, the prism structures of the first and second light redirecting layers are the same asymmetrical shape, and the periods of the first light redirecting layer and the second light redirecting layer are the same and misregistered. FIG. 6 is a cross sectional view of such a dual-sided light redirecting film of this disclosure. In FIG. 6, dual-sided light redirecting film 400, comprises optical substrate 410. To the first side (again first side is arbitrarily assigned) of optical substrate 410 is attached solar light redirecting layer 450. Solar light redirecting layer 450 comprises a film with projecting asymmetrical prism structures 470. Solar light redirecting layer 450 is adhered to the first major surface of optical substrate 410 by adhesive layer 430. Similarly, second solar light redirecting layer 440 with projecting asymmetrical prism structures 460 is adhered to the second major surface of optical substrate 410 by adhesive layer 420. In FIG. 6, prism structures 460 and 470 are the same shape and the periods are the same. The period of the prism structures 460 on solar light redirecting layer 440 and the period of the prism structures 470 on solar light redirecting layer 450 are misregistered. Misregistration is shown by the lack of correspondence of points E and F, similar to the points C and D of FIG. 2.

Figure 5:
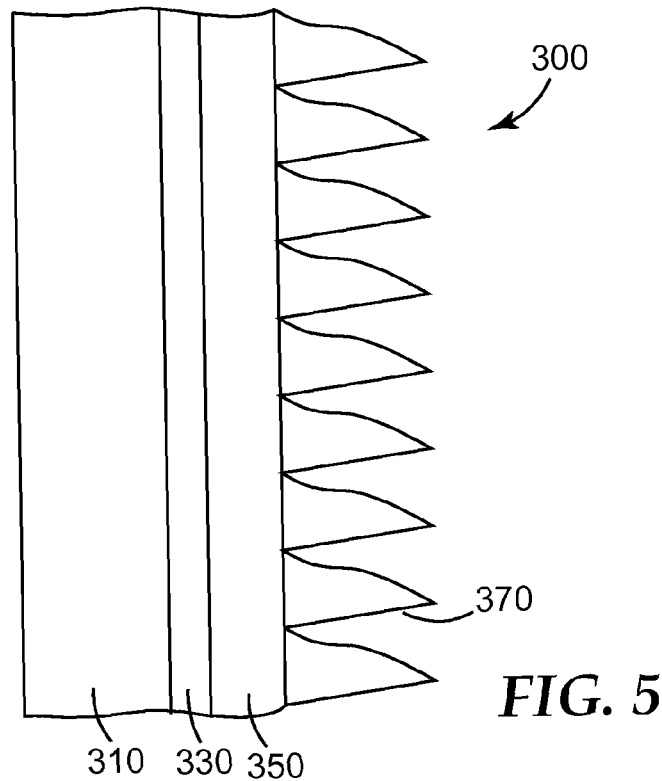
FIG. 5 shows a cross sectional view of a comparative single-sided light redirecting film.

The dual-sided solar light redirecting films of this disclosure and exemplified in FIGS. 3, 4, and 6 can be contrasted with a single sided solar light redirecting film such as shown in FIG. 5 and described in pending US patent application Ser. No. 61/287,360, titled "Light Redirecting Constructions" filed Dec. 17, 2009 (Padiyath et al.), and Ser. No. 61/287,354, titled "Light Redirecting Film Laminate" filed Dec. 17, 2009 (Padiyath et al.). It has been found that the dual-sided solar light redirecting films of this disclosure are able to redirect more incident solar light upwards towards the ceiling of a room, than a corresponding single sided film. Thus, single-sided film 300 of FIG. 5 which includes optical substrate 310, light redirecting layer 350 with projecting asymmetrical prisms 370, which is adhered to optical substrate 310 by adhesive layer 330 is directly comparable to double-sided films 100, 200, and 400 of FIGS. 3, 4, and 6. It has been discovered that films such as 100, 200, and 400 are able to redirect more incident solar light than films like 300. However, this has only been found to be true when the first solar light redirecting layer and the second solar light redirecting layer are not identical or mirror images.

Measurements of the ability of the film constructions to redirect light can be determined by laboratory testing, precluding the need to test the constructions by installing them into windows for testing. An example of such a test involves the shining of a beam of light with a controlled intensity onto the film construction and measuring the amount of light that is redirected upwards. The input beam of light may be set at a given angle or may be varied over a range of angles. The amount of light redirected upwards can be measured, for example, with a photodetector. It may be desirable to measure the distribution of light at all directions. This type of measurement is commonly referred to as bi-directional transmission distribution function (BTDF). An instrument available from Radiant Imaging, Wash., under trade name IMAGING SPHERE may be used to perform such measurements.

Besides the optical substrate and the first and second solar redirecting layers described above, the dual-sided light redirecting films of the present disclosure may comprise additional optional layers. Several examples of optional layers have already been discussed. For example, the optical substrate may be a multi-layer optical substrate and can comprise the additional layers described above. Also, the embodiments of FIGS. 3, 4, and 6 comprise adhesive layers that adhere the first and second solar redirecting layers to the optical substrate. These layers are optional in other embodiments, for example, embodiments in which the solar redirecting layers are formed directly on the optical substrate surfaces or where adhesion is achieved without the use of an adhesive (such as by the application of heat or heat and pressure to directly adhere the solar redirecting layers to the optical substrate). Other optional layers that can be present include film layers, typically optical film layers, that cover one or both solar redirecting layers to cover and protect the microstructured surface(s).

The optional optical film has a first major surface and a second major surface. The second major surface of the optional optical film makes contact with and is bonded to substantially all of the microstructures on the surface of one of the light redirecting layers of the dual-sided light redirecting film. The optional optical film protects the microstructured surface and prevents the structures from becoming damaged, dirty or otherwise rendered incapable of redirecting light.

The second major surface of the optional optical film contacts the tops of the refractive prisms of the microstructured surface which it is covering. At the areas of contact between the optional optical film and the tops of the refractive prisms, these elements are bonded. This bonding may take a variety of forms useful for laminating together two polymeric units, including adhesive bonding, heat lamination, ultrasonic welding and the like. For example, the optional optical film could be heated to soften the film and the film contacted to the microstructured surface of the first optical film. The heated film, upon cooling, forms bonds to the contacted portions of the microstructured layer. Similarly, the optional optical film could be dry laminated to the microstructured surface and then heat, either directly or indirectly, could be applied to produce the laminated article. Alternatively, an ultrasonic welder could be applied to the dry laminate construction. More typically, adhesive bonding is used. When adhesive bonding is used, either a heat activated adhesive or a pressure sensitive adhesive can be used. Generally, pressure sensitive adhesive are used, especially the optically clear pressure sensitive adhesives described above.

To effect the adhesive bonding, the adhesive may be applied either to the microstructured surface, or to the second major surface of the optional optical film. Typically, the adhesive is applied to the second major surface of the optional optical film. The applied adhesive coating may be continuous or discontinuous. The adhesive coating may be applied through any of a variety of coating techniques including knife coating, roll coating, gravure coating, rod coating, curtain coating, air knife coating, or a printing technique such as screen printing or inkjet printing. The adhesive may be applied as a solvent-based (i.e. solution, dispersion, suspension) or 100% solids composition. If solvent-based adhesive compositions are used, typically, the coating is dried prior to lamination by air drying or at elevated temperatures using, for example, an oven such as a forced air oven. The adhesive coated optional optical film can then be laminated to the microstructured surface. The lamination process should be well controlled to provide uniform and even contact on the tips of the microstructured prisms described above.

Besides being the protective layer for the microstructured surface, the optional optical film can also provide additional functionality to the light redirecting laminate. The optional optical film may be the made of the same material or materials as the optical substrate, and may provide the same optional functionality or functionalities as the optical substrate or these two optical constructions may be different. For example, the second optical film can be a multilayer film that can reflect infrared light as described above.

The first major surface of the optional optical film is an exterior surface of the dual-sided light redirecting films of this disclosure. As such it may provide a surface for adhesion to a substrate, such as for example, a window, or it may be an exterior surface that is exposed to the outside environment or to the inside of the room. If the first major surface of the optional optical film is to provide a surface for adhesion to a substrate, it generally has an adhesive layer at least partially coated on it. Examples of suitable adhesives are described above. If the first major surface of the optional optical film is an exterior surface that is exposed to the outside environment or to the inside of the room, it may be desirable to have additional coatings on the first major surface. For example, the first major surface may contain a protective coating such as a hardcoat to prevent the surface from scratches and marks as well as to protect the surface from damage from surface cleaners, or to make the surface graffiti-resistant or easier to clean. Examples of suitable coatings include, for example, hardcoats, anti-scratch coatings, low surface energy coatings or easy clean coatings.

In some embodiments, it may be desirable to have two optional optical films, covering both microstructured surfaces of the dual-sided light redirecting films of this disclosure. The two optional optical films can be the same or different.

The dual-sided light redirecting film constructions of this disclosure may be attached to substrates to provide articles, such as light directing articles. The substrates are at least optically transparent, and may be optically clear. Examples or suitable substrates include, for example, windows. Windows may be made of a variety of different types of glazing substrates such as a variety of glasses or from polymeric materials such as polycarbonate or polymethylmethacrylate. In some embodiments, the window may also comprise additional layers or treatments. Examples of additional layers include, for example, additional layers of film designed to provide glare reduction, tinting, shatter resistance and the like. Examples of additional treatments that may be present of windows include, for example, coatings or various types such as hardcoats, and etchings such as decorative etchings.

The dual-sided light redirecting films of this disclosure may be directly adhered to the substrate or an optional optical film covering the microstructured surface of one the solar light redirecting layers, as described above, may provide the bonding surface. Typically an adhesive layer is used to adhere the dual-sided light redirecting films of this disclosure to the substrate. The adhesive may be one of the adhesives described above, or it may be a more specialized adhesive layer developed to provide easy optically clear lamination of films to substrates. Examples of such adhesives include microstructured adhesives and temporarily removable and/or repositionable adhesives.

Microstructured adhesives are one that have microstructured surface. The microstructured surface is typically imparted to the adhesive surface by a microstructured release liner. An advantage of adhesive layers with a microstructured surface is the microstructured surface permit air egress as the dual-sided light redirecting film is laminated to the substrate. This air egress aids in the elimination of air bubbles in the lamination.

As mentioned above, the adhesive may also be removable, meaning adhesives with relatively low initial adhesion, permitting temporary removability from and repositionability on a substrate, with a building of adhesion over time to form a sufficiently strong bond. This can particularly useful when large areas of a substrate are to be laminated.

Temporarily removable and/or repositionable adhesives are those with relatively low initial adhesion, permitting temporary removability from, and repositionability on, a substrate, with a building of adhesion over time to form a sufficiently strong bond. Examples of temporarily removable adhesives are described, for example in U.S. Pat. No. 4,693,935 (Mazurek). These features permit the film to easily removed or repositioned before the adhesion builds and a strong bond forms.

Examples of suitable articles of this disclosure include ones with a first glazing substrate and dual-sided light redirecting film adhered to the first glazing substrate. The dual-sided light redirecting film may be adhered to either surface of the first glazing substrate, that is to say the film may be on the exterior surface (facing the incident solar radiation and exposed to the outside environment) or on the interior surface (facing into the interior space of the room).

The articles of this disclosure may additionally include a second glazing substrate. The second glazing substrate may be disposed on the first glazing substrate. For example, the glazing substrate may be a multi-pane window. The multi-pane window may contain optional other layers or spaces between or on them.

In other embodiments, the second glazing substrate is disposed on the dual-sided light redirecting film construction. In these embodiments, a sandwich structure is formed where the dual-sided light redirecting film construction is sandwiched between the two glazing substrates.

In still other embodiments, the second glazing substrate is parallel to the first glazing substrate and separated from the first glazing substrate by a void space. In some of these embodiments, the dual-sided light redirecting film construction is located within the void space.

EXAMPLES

These examples are merely for illustrative purposes only and are not meant to be limiting on the scope of the appended claims.

Modeling Procedural Description

A series of light redirecting films were modeled using the general procedural descriptions below to determine the ability of the films to redirect light in a desirable direction. This redirection is described as the "up:down ratio" which describes the ratio of light redirected upwards (which is the desired direction) to the light that is directed downwards.

For the modeling, the films are supported by an optical substrate. The optical substrates are assumed vertically situated and facing directly south at 45 degrees north latitude on about the autumnal equinox of Sep. 21, 2010. The effects of the sun transiting the sky over the course of daylight hours on that date are approximated by computing the transmitted flux directed upwards and downwards at half hour intervals from when the sun rises 15 degrees elevation above the horizon to when it again sets past 15 degrees elevation. An "up:down ratio" is formed from the sum of these total transmitted light fluxes through the optical substrate plus films construction.

Sunrise and sunset for any day of any year at any latitude and longitude were computed using Muneer's PROG1-7, obtained from the National Renewable Energy Lab (NREL). Solar azimuth and elevation at any time of any day of any year at any latitude and longitude were computed using Muneer's PROG1-6, obtained from NREL. Solar irradiance on the optical substrate surface at any time of any day of any year at any latitude and longitude were computed using the SMARTS Code, Version 2.9.5, obtained from NREL.

Optical modeling and raytracing were done for each configuration with optical modeling software ASAP 2010V1R1SP2 from Breault Research Organization.

An executive program to alter run parameters and control the execution of the solar and optical modeling codes was created and run with Mathematica 8.0.0 from Wolfram Research.

Comparative Example C1

The film modeled is illustrated in FIG. 5 and was prepared in the following manner. A master tool having the negative of the desired linear grooves and prismatic elements was obtained using a diamond turning process. A UV curable resin composition was prepared by blending 74 parts by weight of an aliphatic urethane acrylate oligomer, commercially available under the trade designation "PHOTOMER 6010" from Cognis, Monheim, Germany, 25 parts 1,6-hexanediol diacrylate, commercially available under the trade designation "SARTOMER SR 238" from Sartomer, Exton, Pa., and an alpha-hydroxy ketone UV photoinitiator (2-hydroxy-2-methyl-1-phenyl-1-8-propanone), commercially available under the trade designation "DAROCUR 1173" from Ciba, Basel, Switzerland. A 76 micrometer (3 mil) thick PET (polyethylene terephthalate) film, commercially available from DuPont Teijin Films, Hopewell, Va. under the trade designation "MELINEX 453", was coated with the UV curable resin to an approximate thickness of 85 micrometers. The coated film was placed in physical communication with the master tool such that the grooves were void of any air. The resin was cured while in physical communication with the master tool with a microwave powered UV curing system available from Fusion UV systems, Gaithersburg, Md. The cured resin on the web was removed from the master tool resulting in a microstructured film. One liner of a 25 micrometer (1 mil) thick 10 optically clear adhesive transfer tape, commercially available from 3M Company, St. Paul, Minn. under the trade designation "3M OPTICALLY CLEAR ADHESIVE 8171", was removed and the exposed adhesive surface was laminated to the non-structured side of the microstructured film in a roll-to-roll laminator available from Protech Engineering, Wilmington, Del.

The remaining liner of the construction can then be removed and the laminate can then be applied to one of the surfaces of an optical substrate as illustrated in FIG. 5. In FIG. 5, the optical substrate is 310, the adhesive is 330, and the light redirecting layer 350 has microstructures 370. For modeling purposes the distance between microstructures was 3 micrometers, the width of the microstructures as measured parallel to the glass surface was 50 micrometers resulting in a pitch of 53 micrometers. Modeled up:down ratio is reported in Table 1.

Comparative Example C2

The optical substrate of Comparative Example C1 with the exact same light redirecting layer of Comparative Example C1 applied to one side of the optical substrate surface may be further modified by attaching a second light redirecting layer to the other opposing side of the same optical substrate to form a dual-sided film construction as illustrated by FIG. 1 where the first light redirecting layer is shown as 20 and the second light redirecting layer is shown as 10. For modeling purposes this second light redirecting layer was considered identical to the first light redirecting layer and microstructure teeth were registered between the 2 layers as illustrated in FIG. 1. Modeled up:down ratio is reported in Table 1.

Example 1

The optical substrate of Comparative Example C1 with the exact same light redirecting layer of Comparative Example C1 applied to one side of the optical substrate surface may be further modified by attaching a second light redirecting layer to the other opposing side of the same optical substrate. For modeling purposes this second light redirecting layer was considered different than the first light redirecting layer and microstructure teeth were registered between the 2 light redirecting layers as illustrated in FIG. 3. In FIG. 3, first light redirecting layer 150 containing microstructures 170 was attached to optical substrate 110 by adhesive layer 130, and second light redirecting layer 140 containing microstructures 160 was attached to optical substrate 110 by adhesive layer 120. For modeling purposes the distance between microstructures was 3 micrometers, the width of the microstructures as measured parallel to the glass surface was 50 micrometers resulting in a pitch of 53 micrometers. Modeled up:down ratio is reported in Table 1.

The light redirecting construction prepared above can be prepared on a glass substrate. A similar master tool obtained using a diamond turning process could be used. A similar UV curable resin composition containing 74 parts by weight of an aliphatic urethane acrylate oligomer, commercially available under the trade designation "PHOTOMER 6010" from Cognis, Monheim, Germany, 25 parts 1,6-hexanediol diacrylate, commercially available under the trade designation "SARTOMER SR 238" from Sartomer, Exton, Pa., and an alpha-hydroxy ketone UV photoinitiator (2-hydroxy-2-methyl-1-phenyl-1-propanone), commercially available under the trade designation "DAROCUR 1173" from Ciba, Basel, Switzerland could be prepared. A glass plate could be coated with the UV curable resin to an approximate thickness of 85 micrometers. The coated film could be placed in physical communication with the master tool such that the grooves are void of any air. The resin could be cured while in physical communication with the master tool with a microwave powered UV curing system available from Fusion UV systems, Gaithersburg, Md. The cured resin on the web could be removed from the master tool resulting in a microstructured film.

Example 2

The optical substrate of Comparative Example C1 with the exact same light redirecting layer of Comparative Example C1 applied to one side of the optical substrate surface may be further modified by attaching a second light redirecting layer to the other opposing side of the same optical substrate. For modeling purposes this second light redirecting layer was considered identical to the first light redirecting layer but microstructure teeth were misregistered between the 2 light redirecting layers as illustrated in FIG. 6. In FIG. 6, first light redirecting layer 450 containing microstructures 470 was attached to optical substrate 410 by adhesive layer 430, and second light redirecting layer 440 containing microstructures 460 was attached to optical substrate 410 by adhesive layer 420. Points E and F are used to illustrate that the microstructures are misregistered. For modeling purposes the distance between microstructures was 3 micrometers, the width of the microstructures as measured parallel to the glass surface was 50 micrometers resulting in a pitch of 53 micrometers. Modeled up:down ratio is indicated in Table 1.

TABLE 1

| Example | Description | Up:Down Ratio |
|---|---|---|
| Comparative Example C1 | Light redirecting film with structures on one side. | 3.22 |
| Comparative Example C2 | Light redirecting film with structures on both sides of the film, with microstructures registered. | 1.14 |
| Example 1 | Same as CE C2 but second side has different structure than first side. | 4.12 |
| Example 2 | Same as CE C2 but microstructures are misregistered. | 4.03 |

What is claimed is:
1. A light management construction comprising:
an optical substrate having a first major surface and a second major surface opposite the first major surface;
a first solar light redirecting layer disposed on the first major surface of the optical substrate, wherein the first solar light redirecting layer comprises a first microstructured surface comprising a periodic ordered arrangement of a plurality of multi-sided refractive prisms; and
a second solar light redirecting layer disposed on the second major surface of the optical substrate, wherein the second solar light redirecting layer comprises a second microstructured surface comprising a second periodic ordered arrangement of a plurality of multi-sided refractive prisms, such that the first solar light redirecting layer and the second solar light redirecting layer are not identical or mirror images and wherein the periods of the periodic arrangements are the same or whole number multiples of each other, and wherein the asymmetric refractive prisms of the first solar light redirecting layer and the asymmetric refractive prisms of the second solar light redirecting layer comprise the same shape and the periods are misregistered, and wherein the light management construction redirects solar lights from the normal incident downwards direction to an upwards direction.

2. The light management construction of claim 1, wherein at least the first solar light redirecting layer comprises a first optical film having a first major surface and a second major surface opposite the first major surface, wherein the first major surface of the optical film comprises a microstructured surface comprising asymmetrical structures, wherein the asymmetrical structures comprise an ordered arrangement of a plurality of multi-sided refractive prisms, wherein a cross section of each of the multi-sided refractive prisms comprise at least 4 sides (sides A, B, C, and D) such that: side A of each of the multi-sided refractive prisms is parallel to and adjacent to the first major surface of the optical substrate; side B of each of the multi-sided refractive prisms is joined to side A and is designed to produce total internal reflection of light rays incident upon the second major surface of the optical substrate at an angle of from 5-80° above the horizontal of normal to side A; side C of each of the multi-sided refractive prisms is joined to side A; and side D of each of the multi-sided refractive prisms is connected to side C and side B, and is designed to substantially redirect light rays reflected from side B in a direction away from side B and towards the side C and/or D, and wherein the second major surface of the first optical film is adhered to the optical substrate.

3. The light management construction of claim 2, wherein the asymmetrical structures protrude 50 micrometers to 250 micrometers from the first major surface of the optical film.

4. The light management construction of claim 2, wherein the asymmetrical structures comprise a thermoplastic or a thermoset material.

5. The light management construction of claim 2, wherein the second solar light redirecting layer comprises a second optical film having a first major surface and a second major surface opposite the first major surface, wherein the first major surface of the second optical film comprises a microstructured surface comprising a plurality of multi-sided refractive prisms, and wherein the second major surface of the second optical film is adhered to the optical substrate.

6. The light management construction of claim 5, wherein the first major surface of the second optical film comprises a microstructured surface comprising an ordered arrangement of a plurality of asymmetrical multi-sided refractive prisms.

7. The light management construction of claim 5, wherein at least one of the first optical film and the second optical film is adhered to the optical substrate by an optically clear adhesive layer.

8. The light management construction of claim 1, further comprising additional layers.

9. The light management construction of claim 8, wherein the additional layers comprise at least one of an optical film layer, an adhesive layer, a multilayer substrate layer, or a combination thereof.

10. The light management construction of claim 9, wherein the multilayer substrate layer comprises an infrared light reflecting layer, an infrared absorbing layer, a tear resistant layer, a light diffusing layer, an ultraviolet light blocking layer, a polarizing layer or a combination thereof.

11. An article comprising:
a first glazing substrate;
a light management construction attached to the first glazing substrate, the light management construction comprising:
an optical substrate having a first major surface and a second major surface opposite the first major surface;
a first solar light redirecting layer disposed on the first major surface of the optical substrate, wherein the first solar light redirecting layer comprises a first microstructured surface comprising a periodic ordered arrangement of a plurality of multi-sided refractive prisms; and
a second solar light redirecting layer disposed on the second major surface of the optical substrate, wherein the second solar light redirecting layer comprises a second microstructured surface comprising a second periodic ordered arrangement of a plurality of multi-sided refractive prisms, such that the first solar light redirecting layer and the second solar light redirecting layer are not identical or mirror images and wherein the periods of the periodic arrangements are the same or whole number multiples of each other, and wherein the asymmetric refractive prisms of the first solar light redirecting layer and the asymmetric refractive prisms of the second solar light redirecting layer comprise the same shape and the periods are misregistered, and wherein the light management construction redirects solar light from the normal incident downwards direction to an upwards direction.

12. The article of claim 11, wherein the first solar light redirecting layer is disposed on the first major surface of the optical substrate, and the second solar light redirecting layer is disposed on the second major surface of the optical substrate, and the first solar light redirecting layer is disposed on the first glazing substrate.

13. The article of claim 11, wherein the first solar light redirecting layer is disposed on the first major surface of the optical substrate, and the second solar light redirecting layer is disposed on the second major surface of the optical substrate, and the second solar light redirecting layer is disposed on the first glazing substrate.

14. The article of claim 11, further comprising a second glazing substrate.

15. The article of claim 14, wherein the second glazing substrate is disposed on the first glazing substrate.

16. The article of claim 14, wherein the second glazing substrate is disposed on the light management construction.

17. The article of claim 14, wherein the second glazing substrate is parallel to the first glazing substrate and separated from the first glazing substrate by a void space.

18. The article of claim 17, wherein the light management construction is located within the void space.

* * * * *